United States Patent [19]

Louder et al.

[11] 4,399,433
[45] Aug. 16, 1983

[54] ALARM SYSTEM FOR A TISSUE PROCESSOR

[75] Inventors: Nevitt M. Louder; Carlo E. Cuomo, both of Verona; Paul F. Secosky, Greensburg, all of Pa.

[73] Assignee: Allied Corporation, Morris Township, N.J.

[21] Appl. No.: 300,820

[22] Filed: Sep. 10, 1981

[51] Int. Cl.³ ............................................. G08B 21/00
[52] U.S. Cl. ..................................... 340/626; 118/50; 134/95; 134/103; 141/95; 141/198; 222/64; 340/618; 222/638; 422/67; 422/99
[58] Field of Search ............... 340/626, 618; 118/663, 118/712, 713, 714, 50, 702; 422/67, 99; 141/95, 198; 222/64, 638, 639, 641, 647, 648, 649, 651; 184/103 R, 103 A; 134/95, 103

[56] References Cited

U.S. PATENT DOCUMENTS

| | | | |
|---|---|---|---|
| 2,786,603 | 3/1957 | Holmberg et al. | 222/64 |
| 3,128,912 | 4/1964 | Cash | 222/64 X |
| 3,632,019 | 1/1972 | Harm | 222/64 X |
| 4,006,762 | 2/1977 | Badger | 141/198 |
| 4,058,148 | 11/1977 | Potter | 141/198 |
| 4,141,312 | 2/1979 | Louder et al. | 422/99 X |
| 4,272,761 | 6/1981 | Newman | 222/64 X |
| 4,285,446 | 8/1981 | Rapp et al. | 222/639 |

Primary Examiner—John W. Caldwell, Sr.
Assistant Examiner—Daniel Myer
Attorney, Agent, or Firm—Webb, Burden, Robinson & Webb

[57] ABSTRACT

An annunciator and/or shut-down system for an automatic processor for treating tissue specimens. In a tissue processor of the type wherein the reagents are drawn from reagent containers into the reaction vessel by drawing a vacuum on the vessel and reagents are returned to their respective reagent containers by gravity, the filled or unfilled condition of the reaction vessel is determined by sensing the vacuum condition during two time intervals; one near the start of filling and one just after filling is normally completed. The vacuum condition indicative of a filling or filled vessel differs for each sensing time interval. Logic circuitry analyzes the sensor condition for the specific time interval and, if the condition is maintained over a predefined delay period, outputs a short duration shut-down signal which causes latching of a mechanical shut-down and/or annunciator switch. The logic circuitry accepts additional pulse signals, processes them for predefined delay, and outputs a shut-down signal corresponding thereto.

7 Claims, 7 Drawing Figures

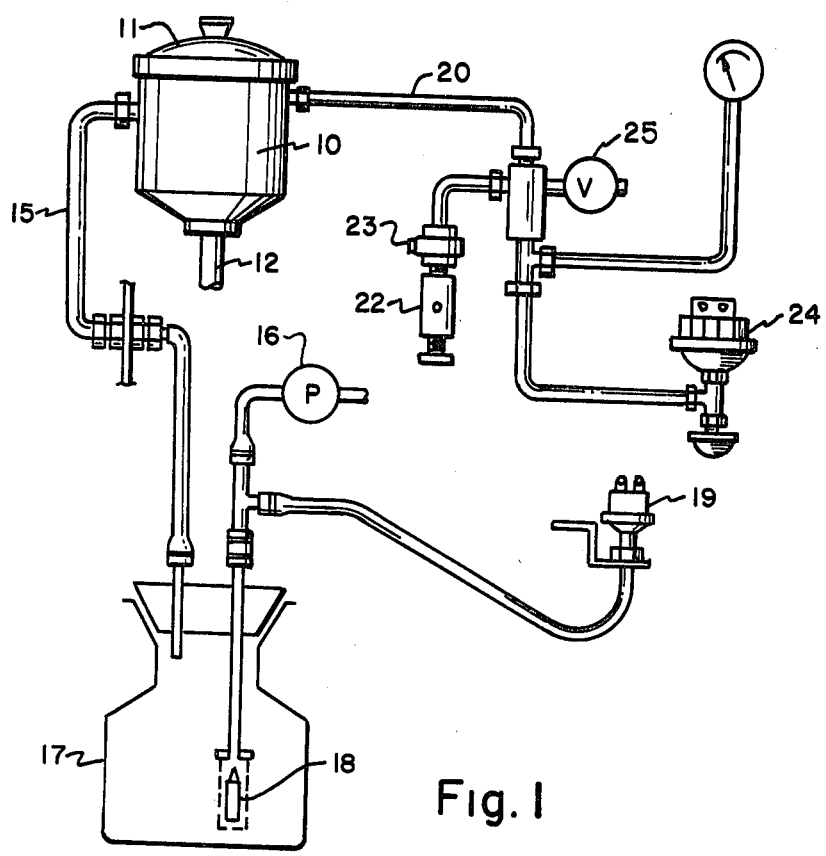
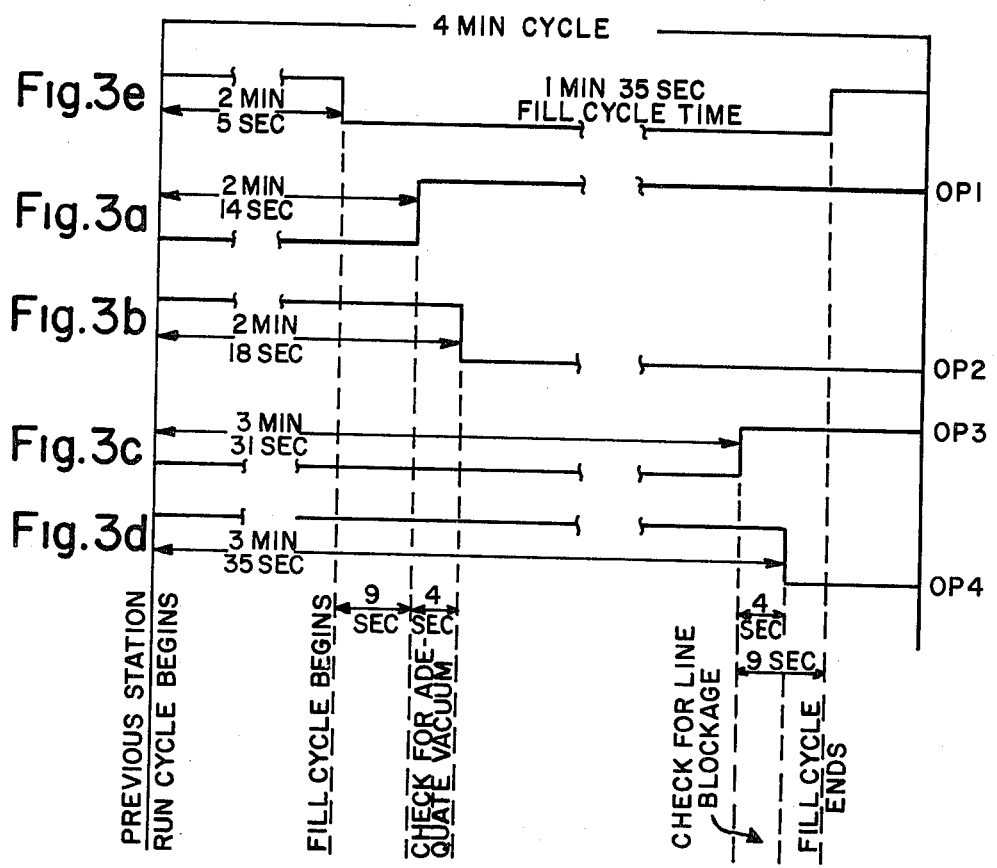

ALARM SYSTEM FOR A TISSUE PROCESSOR

BACKGROUND OF THE INVENTION

This application relates to a shut-down and/or annunciator system for an automatic reaction vessel that is used to treat tissue specimens or the like by immersing them in reagents. The specific application in which the system was first used was in a histological tissue processor of the type described in U.S. Pat. No. 4,141,312. In that patent, the vessel is referred to as a tissue container.

In a histological tissue processor of the type described in the above noted patent, tissue specimens are immersed in a reagent by selectably connecting the vessel to a reagent source or reagent container by a conduit that opens into the vessel and into the bottom of the reagent container and by drawing a vacuum upon the vessel. The vacuum within the vessel draws reagent from the reagent container. the specimens are soaked for some period of time in the reagent. Sometimes reagents are heated by heating the vessel and/or a vacuum is drawn over the surface of the reagent during the soak. Therefore, it is absolutely essential that the vessel fills with the reagent when the specimens are positioned therein. Otherwise, the specimens could quickly be destroyed by heat and/or vacuum at great expense and inconvenience. In the reaction vessel of the type described in the noted patent, the reagent is returned to the reagent containers by gravity drain.

Two conditions may result in the failure of the vessel to fill with reagent when the reagent is to be drawn into the vessel by vacuum. Either the vacuum system fails or there is a blockage between the reaction vessel and the reagent source. A valid shut-down and/or annunciator system, of course, must respond to any circumstances under which the vessel does not fill.

It is undesirable to place a float-type sensor in the vessel as float sensors tend to become battered by specimen holders and even clogged by the reagents. (Typically the specimens in a tissue processor are impregnated with paraffin as the last step in preparation for analysis.) A float-type sensor also requires leads passing through the walls of the reaction vessel introducing a potential location for leakage.

It is an advantage according to this invention to provide a shut-down and/or annunciator system that detects the unfilled condition of the reaction vessel without placing a flow-type level sensor within the vessel.

By way of background, it should be understood that when a vacuum is drawn upon a vessel at the beginning of the fill cycle and the vessel is connected to the reagent source, the vacuum will exceed a preselected limit. It will continue to exceed the preselected limit as long as the source can supply reagent. When the source is exhausted of reagent, air is drawn through the reagent source and the vacuum over the vessel will be diminished. Thus, the vacuum will no longer exceed the preselected limit when the air is drawn into the vessel at the end of the normal filling cycle. If the reagent source is plugged or a valve between the vessel and the reagent container does not open, the vacuum will remain above the preselected level at the end of the normal fill cycle. If the vacuum system is defective, the vacuum will never exceed the preselected limit.

The commercial embodiment of the tissue processor described in the noted patent has been sold for over a year prior to the filing of this application. In that embodiment, the vacuum in the reaction vessel is limited by a pressure release valve to less than four inches of mercury during the filling cycle which normally lasts about one minute and twenty-five seconds. The vacuum is limited to about four inches of mercury to minimize the boiling action that takes place when the solvent source becomes empty and air enters the vessel. When the container of solvent is emptied and air enters the reaction vessel through the solvent source container, the drop in vacuum below 1.5 inches of mercury is sensed to switch the vacuum pump off and to close the valve connecting the tissue container to the reagent container.

SUMMARY OF THE INVENTION

Briefly according to this invention, there is provided an annunciator and/or shut-down system for a vacuum vessel filled with liquid by application of vacuum thereto. The system comprises a vacuum switch that outputs a digital signal indicative of whether or not the vacuum in the vessel is above or below a preselected level. Typically, the level is selected to be equal to a vacuum that will draw liquid into the vessel but to be greater than a vacuum that can be maintained in the vessel when air may be drawn thereinto. The system comprises a timer for generating first and second gate signals. The first gate signal exists during the first few seconds of the normal filling period and the second gate signal exists during the last few seconds of the normal filling period.

The system comprises a mechanical latch, such as a magnetically actuated relay for responding to a shut-down signal for latching shut-down and/or annunciator switches. The system according to this invention comprises a logic circuit for generating at least one short duration shut-down signal either (i) in response to the first gate signal and the output of the vacuum switch indicative of insufficient vacuum in the vessel to draw liquid thereinto or (ii) in response to the second gate signal and the output of the vacuum switch indicative of a high vacuum condition. Preferably according to this invention, the short duration shut-down signal is applied to the mechanical latch which latches shutdown and/or annunciator switches. Preferably according to this invention, a delay circuit is positioned between the logic circuit and the mechanical latch such that the short-duration signal must have a preselected duration before the mechanical latch is activated. It is further preferred according to this invention that the logic circuit includes means for accepting and processing additional shut-down signals such as a shut-down signal indicative of an overflow condition.

DESCRIPTION OF THE DRAWINGS

FIG. 1 is a schematic of the mechanical apparatus in a tissue processing system according to this invention;

FIGS. 3a, 3b, 3c, 3d, and 3e Are timing diagrams illustrating the logic conditions at various locations in the circuit of FIG. 2.

DESCRIPTION OF THE PREFERRED EMBODIMENTS

Figure 2:
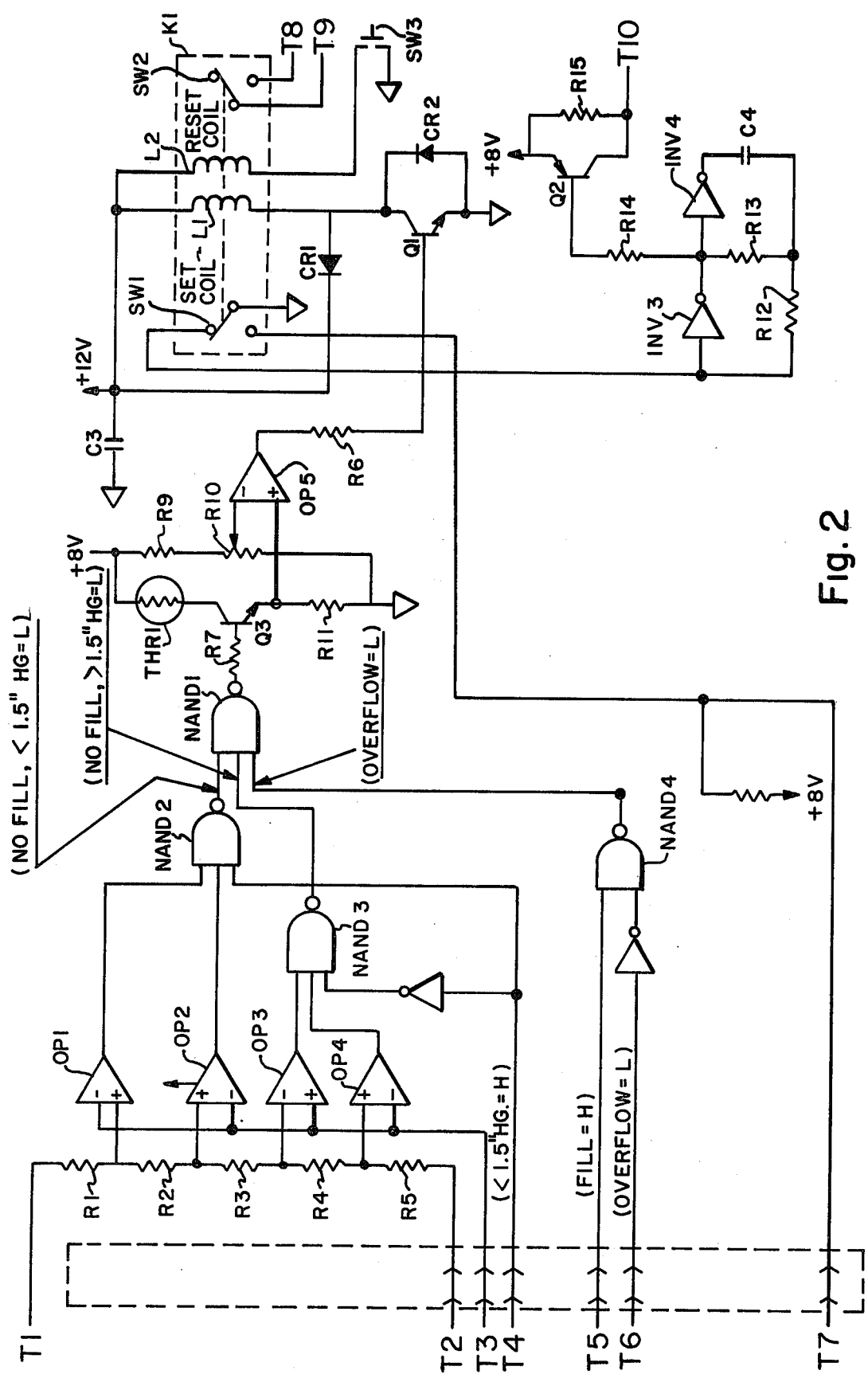
FIG. 2 is a schematic of the annunciator and/or shut-down circuitry according to this invention.

Referring to FIG. 1, the apparatus used in the preferred embodiment of this invention is illustrated schematically. A vessel or tissue container 10 is provided with a sealable cover 11. A conduit 12 is in communication with the bottom of the vessel and is arranged for selectable connection with reagent or paraffin sources (not shown). The sources comprise containers having at least atmospheric pressure over the surface of the reagent. Conduits extend down into the reagent containers opening near the bottom of the containers. The conduit 12 can be brought into communication with the conduits extending into the reagent containers. (For details of this arrangement, see U.S. Pat. No. 4,141,312.) Two other conduits are connected to the reagent vessel 10 above the normal level of reagent when the vessel is filled; namely, an exhaust conduit 15 and a vacuum level or control conduit 20. The exhaust conduit 15 is connected to the exhaust pump 16. A trap bottle 17 is provided in the exhaust conduit. The trap bottle has a float check valve 18 that will block passage to the pump if reagent is drawn into the trap bottle. Vacuum switch 19 is connected into the exhaust conduit between the trap bottle 17 and the pump 16. Should reagent overflow into the trap bottle, the vacuum at the intake side of the exhaust pump will sharply increase causing the vacuum switch 19 to output an overflow signal. It should be understood that the vessel is used to impregnate specimens with molten paraffin after reagent treatment. Should the paraffin enter the exhaust conduit 15, it will quickly plug or restrict the conduit also causing activation of the vacuum switch 19. The switch 19 is activated typically when the vacuum exceeds ten inches of mercury.

The vacuum level control conduit 20 is in communication with the relief valve 22 that limits pressure in the vessel to about four inches mercury during the fill cycle. The relief valve 22 is blocked from the vessel by solenoid valve 23 at other times. Solenoid valve 25 exhausts the vessel at the end of a treatment cycle by allowing atmospheric pressure in the vessel. Pressure sensor 24 (connected to the vacuum level control conduit 20) outputs a signal indicative of specific vacuum levels and in particular is designed to provide a signal indicating whether the vacuum is above or below a preselected level, say, 1.5 inches of mercury. The signal relating to the 1.5 inches of mercury is used to turn off the vacuum pump before the end of a fill cycle as determined by the mechanical timer and is also used to detect the no filling and unfilled condition. As explained above, a vacuum in the vessel below about 1.5 inches of mercury at the start of the fill cycle is indicative of a nonfilling condition which will not change. A vacuum above about 1.5 inches of mercury at the end of the fill cycle is an indication of a no fill condition.

The output of the pressure sensor 24 may, for example, be a CMOS logic high or "1" for the low pressure condition (less than 1.5 inches of mercury) and a logic low or "0" for the high pressure condition (greater than 1.5 inches of mercury). (Of course, the logic signals might be selected otherwise but they will be assumed as described in the remainder of the specification.)

As generally explained in the noted patent, the tissue processor has a drain cycle during which reagent presently in a reaction vessel is removed by opening a valve 25 to admit atmospheric pressure to the vessel and opening another valve to permit draining by gravity. This is followed by a short seek cycle during which the next reagent container is selected. A fill cycle then begins. The drain, seek and fill cycles all take place within a period of four minutes. The timing of these cycles is measured from completion of the previous run cycle. During the run cycle, the tissue samples are treated with the reagent in the vessel. The sequence of operations during the four minutes (drain, seek, fill) is controlled by a mechanical timer. The timer comprises a one-quarter rpm a.c. motor driving a rotary wiper potentiometer. The potentiometer is connected in a circuit so that the voltage on the wiper is an ever increasing ramp voltage that is more or less linearly increased with time. Thus, with one rotation of the a.c. motor, the voltage at the wiper over the four minute period increases from a minimum to maximum value and then almost immediately drops to the minimum value. An electrically generated ramp voltage might be substituted for that generated by the a.c. motor and potentiometer. A substantial advantage of the mechanical timer, however, is that the amount of time since the start of the four minute period is not lost on a power shut-down. The voltage on the wiper is an input to a timing circuit comprising a voltage divider network and a plurality of operational amplifiers that are arranged as level detectors. Each junction between resistors in the voltage divider network reaches a reference level at a different time during the application of the ramp voltage to the divider network.

Referring now to FIG. 2, the first positive reference voltage is applied to terminal T1 which is common with the upper end of the voltage divider comprising resistors R1, R2, R3, R4 and R5. The other end of the voltage divider, common with terminal T2, is connected to a second constant reference voltage; say, ground. The positive going output of the wiper of the mechanical timer is applied to terminal T3. The four junctions between the five series connected resistors are each connected to a level detector comprising an operational amplifier (op amp) OP1, OP2, OP3, OP4, respectively. The junction is connected to the noninverting input if the operational amplifier is to go from low to high when the junction reaches the second reference level and to the inverting input if the output is to go high to low when the junction voltage reaches the second reference level. The outputs of the op amps are changed in sequence as follows: OP1 goes low to high; OP2 goes high to low; OP3 goes low to high; and OP4 goes high to low. Reference voltages and resistor values in the divider network are selected, for example, to provide the output logic states as illustrated in FIGS. 3a, 3b, 3c, and 3d respectively.

Referring now to FIG. 3a, op amp OP1 goes high 134 seconds after the cycle of the mechanical four minute timer begins. This is about nine seconds after the start of the fill cycle during which time, under normal conditions, a vacuum of about four inches of mercury will develop within the reaction vessel. At this time, the output of op amp OP2 is also high. Two highs are thus applied to the three input nand gate, NAND2. OP2 remains high for about four seconds after OP1 goes high (see FIG. 3b). During this period of time, two of the three inputs to NAND2 are high. Except for the short interval between transition of OP1 and OP2, the output of NAND2 must be high as at least one input is low. The output of the pressure sensor 24 (high for vacuum, less than 1.5 inches of mercury) is applied to the third input of NAND2. The output of pressure sensor 24 at the start of the fill cycle is normally low because a vacuum is present as a result of the pump being in operation and fluid in the reagent tanks is in the process of being drawn into the tank. Thus the input to NAND2 under normal start of fill condition are two highs and one low. The output of NAND2 during this period is normally high. If the vacuum does not exist at the start of the fill period, then three highs are applied to NAND2 and the output goes low. This low is applied to nand gate NAND1 which "ORs" this shut-down condition signal with others.

Referring to FIG. 3c, the output of op amp OP3 goes high 211 seconds after the start of the four minute period timed by the mechanical timer. At this time, the output of op amp OP4 is high and remains so for four seconds (see FIG. 3d). By this time, the vessel has usually drawn up all the reagent from the reagent container and the vacuum has been reduced to the extent that it is less than 1.5 inches of mercury. Thus the output of the pressure switch 24 is normally high at the time. This signal is inverted and applied to one input of three input nand gate NAND3. The output of OP3 and OP4 are also applied to NAND3. Under normal conditions at the end of a fill cycle, two highs and one low will be applied to NAND3 and its output will therefore be high. Except for the short four second interval between the transition of OP3 and OP4 the output of NAND3 must be high as at least one input will be low. Should a high vacuum cause the inverted output of pressure sensor 24 to be high, then three highs will be applied to NAND3 during the four second period at the end of the fill cycle resulting in a low output for NAND3. This output is "ORed" at NAND1 with two other shut-down condition signals.

Referring now to FIG. 3e, the drain and seek cycles use the first 125 seconds of the four minute period timed by the mechanical timer in the preferred embodiment. The system provides a signal at terminal T5 indicative of the fill cycle. This signal may be applied to one input of 2 input nand NAND4. The other input to NAND4 is the inverted output of the overflow detector (available at T6) which goes high with an overflow (i.e., the pressure at the detector 19 (see FIG. 1) exceeds ten inches of mercury). If the overflow condition exists during the fill cycle, the output of NAND4 gose low, this output is then applied to gate NAND1 which "ORs" the overflow condition signal with two other signals.

If any of the normally high inputs to NAND1 goes low, the output goes high activating a time delay circuit comprising Thermistor THR1, transistor Q3, resistor R11, potentiometer R10 and op amp OP5. THR1 has a negative coefficient, i.e., resistance lowers as the time current is conducted lengthens. The delay circuit will not pass a short duration shut-down signal but preferably requires it to be present for at least about 1.5 seconds.

The shut-down signal from OP5 is a high (1) which applied to the base of transistor Q1 permits conduction through the relay coil L1. This draws in relay switch SW1. This causes the disable input to the oscillator (comprising inverters INV3 and INV4 and transistor Q2) to float. Thus an oscillating signal for flashing a light or activating a buzzer is output at terminal T10. Also, a normally high output T7 which is available to activate a shut-down circuit is grounded by the closing of switch SW1. A second relay switch SW2 is also pulled in and may be used to close an alarm circuit; for example, a telephone switching circuit comprising terminals T8 and T9.

OPERATION

The filling period available during the four minute mechanically timed cycle is about one minute and thirty-five seconds. During this filling period, the alarm circuit first checks that the process chamber has obtained a vacuum of more than 1.5 inches of mercury after nine seconds of operation. Then nine seconds before the end of the fill operation, the circuit checks for vacuum below 1.5 inches of mercury. The first check determines if enough vacuum is present to fill the chamber; the second determines if the vacuum is still present at the end of the fill cycle. Each check is present for only four seconds after initiation.

The sequence and duration of these checks are controlled by a ramp voltage developed by the mechanical four minute timer. The ramp signal is present at T1. As the ramp voltage increases, op amps OP1, OP2, OP3, OP4 are sequentially activated and decoded by nand gates NAND2 and NAND3. This provides a four second sample at the proper time of the fill cycle of the logic state at T4. This logic state represents the contact position of the 1.5 inches of mercury vacuum switch 24.

When the logic state at T4 is high, the pressure which contacts are opened indicating that the chamber vacuum is less than 1.5 inches of mercury. If the logic state is low, the vacuum is greater than 1.5 inches of mercury (switch contacts close).

The overflow system comprises a vacuum switch and a float valve in the trap bottle. When the vacuum switch opens (at about ten inches of mercury), the alarm system is activated. The principal of operation of the overflow detection system is simple. The float valve is mounted within the trap bottle so that an overflow of solvent will cause the valve to rise and eventually block the vacuum inlet line to the pump. The valve action will result in an increase of vacuum in the blocked inlet line. Since the vacuum switch is within this line, an increase of vacuum of greater than 10 inches of mercury will activate the switch turning on the alarm circuit. In the event of a paraffin overflow, the system has sufficient sensitivity to cause an alarm indication as soon as the paraffin enters the vacuum line. The overflow alarm circuit is only operational during the fill cycle.

The overflow condition logic activates the output relay K1 when a low is present at T6 during the fill cycle.

The logic prevents false activation of the output relay. A shut-down signal duration of, say 1.5 seconds, is required by the circuit consisting of OP5, Q3, and THR1. When overflow occurs, the output of NAND1 goes high turning on Q3. THR1 (collector load) thus begins to heat up causing the emitter voltage across R11 to increase. The emitter voltage is then continually compared by OP5 with a reference set by potentiometer R10. When the voltages are equal, OP5 activates relay K1 through transistor driver Q1. About a 1.5 second delay is desirable.

When any alarm condition activates (sets) the output relay, the logic state at T7 is set low. This notifies the remaining circuitry that shut-down is required. The relay also turns on multivibrator comprising INV3 and INV4 which provides an output at T10 for flashing a light or buzzing an alarm. The relay may be reset at any time by depressing the reset push button SW3.

Having thus described the invention with the detail and particularity required by the Patent Laws, what is desired protected by Letters Patent is set forth in the following claims.

We claim:
1. A shut-down and/or annunciator system for a vacuum vessel arranged to be filled with liquid by application of a vacuum thereto comprising:

a vacuum sensitive switch that outputs a logic signal indicative of whether the vacuum in the vessel is above or below a preselected level;

a timer circuit for generating first and second gate signals, the first gate signal after the first few seconds of a filling period and the second gate signal during the last few seconds of the filling period;

means for generating a short duration shut-down signal in response to the first gate signal and the output of the vacuum switch or the second gate signal and the output of the vacuum switch; and a mechanical latch responsive to said shut-down signal for outputting a continuous shut-down and/or alarm signal.

2. A shut-down and/or annunciator system according to claim 1 further comprising a delay circuit between the means for generating a shut-down signal and the latch such that the short duration signal must have a predetermined duration before activating said latch.

3. A shut-down and/or annunciator system according to claims 1 or 2 having means for receiving additional shut-down signals and applying said signals to said mechanical latch.

4. A shut-down and/or annunciator system for a vacuum vessel arranged to be filled with liquid by application of a vacuum thereto comprising:

a vacuum sensitive switch that outputs a logic signal having a first state indicative of whether the vacuum in the vessel is sufficiently high to draw liquid into the vessel and a second state indicative of a vacuum diminished as a result of air being drawn into the vessel;

a timer circuit for generating first and second gate signals, the first gate signal during the first few seconds of a filling period and the second gate signal just after the time when the vessel is normally filled;

means for generating a short duration shut-down signal in response to the first gate signal and the output of the vacuum switch;

means for generating a short duration shut-down signal in response to the second gate signal and the inverted output of the vacuum switch; and a mechanical latch responsive to said shut-down signals for outputting a continuous shut-down and/or alarm signal.

5. A shut-down and/or annunciator system according to claim 4 further comprising a delay circuit between the means for generating a shut-down signal and the latch such that the short duration signal must have a predetermined duration before activating said latch.

6. A shut-down and/or annunciator system for a vacuum vessel arranged to be filled with liquid by application of a vacuum thereto comprising:

a vacuum sensitive switch that outputs a logic signal indicative of whether the vacuum in the vessel is above or below a preselected level;

a timer comprising a motor driven potentiometer, a resistor divider and a plurality of op amps level detectors for generating first and second gate signals, the first gate signal during the first few seconds of a filling period and the second gate signal during the last few seconds of the filling period;

means comprising a digital logic circuit for generating a short duration shut-down signal in response to the first gate signal and the output of the vacuum switch or the second gate signal and the output of the vacuum switch; and a mechanical latch comprising a latching relay switch and a transition switch on the coil circuit thereof, said latch responsive to said shut-down signal for outputting a continuous shut-down and/or alarm signal.

7. A shut-down and/or annunciator system according to claim 1 further comprising a delay circuit comprising a transistor with a thermistor in series therewith and an op amp level detector for detecting when the thermistor has sufficiently changed resistance, said delay circuit being between the means for generating a shut-down signal and the latch such that the short duration must have a predetermined duration before activating said latch.

* * * * *

UNITED STATES PATENT AND TRADEMARK OFFICE
CERTIFICATE OF CORRECTION

PATENT NO. : 4,399,433

DATED : August 16, 1983

INVENTOR(S) : Nevitt M. Louder et al.

It is certified that error appears in the above–identified patent and that said Letters Patent are hereby corrected as shown below:

Column 6 Line 18 "which" should read —switch—.

Signed and Sealed this

Eleventh Day of October 1983

[SEAL]

Attest:

GERALD J. MOSSINGHOFF

Attesting Officer    Commissioner of Patents and Trademarks